United States Patent Office 3,075,928
Patented Jan. 29, 1963

3,075,928
PREPARATION OF FLAME-RESISTANT URETHANE FOAMS
William M. Lanham, Charleston, W. Va., assignor to Union Carbide Corporation, a corporation of New York
No Drawing. Filed July 26, 1960, Ser. No. 45,299
8 Claims. (Cl. 260—2.5)

This invention relates to flame-resistant polyurethane foams, and particularly to such compositions which are self-extinguishing and possess a high degree of flame resistance.

Synthetic urethane foams derived from reactions involving isocyanates with active hydrogen-containing polyethers are finding widespread utility in the field of insulation, structural reinforcement, cushioning, electrical encapsulation and in domestic electrical equipment such as refrigerators, freezers and the like. One formidable factor limiting the commercial utilization and growth potential of the foamed urethane products is their risk of flammability in applications where high temperatures and/or exposure to fire may be encountered.

Various organic and inorganic compounds which have been recommended for the flameproofing of fibers, textiles, wood and plastics include, among others, boron, phosphorus and chlorine-containing compounds, the oxides of zinc, bismuth, antimony, arsenic and mixtures thereof. However, the incorporation of such compounds in low density urethane foams having large surface areas frequently results in a loss of desired physical properties, e.g., tensile strength, compression set, elongation and load bearing properties, which limit the utility of the foam for its intended purpose. For example, the incorporation of a hygroscopic flame-proofing additive in a urethane foam may reduce flammability tendencies but at the same time effect increase moisture absorption, thus resulting in poor aging characteristics. Similarly the use of flameproofing additives may upset the surface chemistry of the foaming system and lead to severe destruction of internal cell structures, formation of a coarse cell structure and/or collapse of the foam. The difficulty in successful flameproofing urethane foams as opposed to bulk materials is further complicated by the troublesome problems of proper additive distribution at gas-solid interfacial surfaces due to the inherent physical movement of the composition during the foaming operation.

The present invention is based on the discovery that flameproofing additives consisting of a vinyl halide resin and antimony trioxide are highly effective for achieving flame resistance in cellular polyurethane foams prepared from polyether-isocyanate reaction systems wherein the polyether is a derivative of an acyclic or alicyclic compound. It has been found that when minor amounts of a vinyl halide resin and antimony trioxide are incorporated in polyether-isocyanate reaction systems of the above type and the mixture subsequently foamed by the one-shot, semiprepolymer or prepolymer technique, flame-resistant polyurethane foams are obtained which possess a high degree of flame resistance and exhibit a significant retention of desired physical properties. By means of the present invention urethane compositions classified as either self-extinguishing or non-burning in the ASTM D-1692 flammability test are readily prepared which thus broadens considerably their realm of practical utility.

The term "flame-resistant" as employed herein is used to characterize a material which does not burn readily. The terms "burning," "self-extinguishing" and "non-burning" are defined in accordance with the "Tentative Method of Test for Flammability of Plastic Foams and Sheeting," ASTM D-1692-59-T. In this test the flame of a Bunsen burner, having a blue cone of about 1½ inches in height, is applied separately to the front edge of ten foam specimens, 6" x 2" x ½", and allowed to remain in contact therewith for a period of sixty seconds. The extent of burning is considered the furthermost point reached by the flame front whereas the burning rate in inches per minute is a measure of the time necessary for the flame front to consume five inches of the foam specimen. A sample is judged "non-burning" if no evidence of ignition, such as flame or progressive glow, is seen in each specimen after removal of the flame. If the flame front of two or more specimens reaches the five inch mark the sample is judged "burning." A sample is judged "self-extinguishing" when ignition of the ten specimens gives an extent of burning less than five inches.

In accordance with the invention polyurethane foams which are self-extinguishing and possess a high degree of flame resistance are prepared by mixing together a polyisocyanate and polyether derivative of an acyclic or alicyclic compound containing active hydrogens with about 2.0 to 8.0% by weight antimony trioxide and about 3.0 to 12.0% by weight of a vinyl halide resin, building up the urethane polymer network and thereafter developing the foam reaction. The vinyl halide resin and antimony oxide flameproofing ingredients can be added to the liquid polyether, the isocyanate or the polyether-isocyanate reaction mixture. The mixture is then foamed in the presence of a catalyst by means of a blowing agent or internal development of carbon dioxide. The network formation and building up of the foam can take place substantially simultaneously, as in the one-shot method, or in more or less distinct steps as in the prepolymer and semiprepolymer techniques, more fully described hereinafter.

The amount of antimony trioxide and vinyl halide resin used for purposes of the invention is not narrowly critical. However, to obtain urethane foams of optimum flame resistance which suffer no major effects on desired properties, the preferred amount of vinyl halide resin and antimony trioxide ranges respectively from 4.0 to 8.0% and 3.0 to 6.0% by weight based on the weight of the polyether-isocyanate reaction mixture.

The vinyl halide resins used for purposes of the invention are characterized as having a reduced viscosity of 0.1 and lower to about 10.0 and higher in the best solvent available for a particular resin. The preferred range in this invention is 0.1 to 4.0. Reduced viscosity may be determined with the Ubbelohde, Ostwald or equivalent viscometer in the temperature range between 20° C. and 30° C. using a resin concentration in solution sufficiently low to produce an approximate linear relationship between reduced viscosity and polymer concentration between infinite dilution and the concentration at which the reduced viscosity is determined. Reduced viscosity is defined as:

$$I_r = \frac{T - T_o}{(T_o)(C)}$$

in which T is the time required for a low concentrate resin solution to pass through a standardized Ubbelohde viscometer; $T_o$ is the time for the pure solvent to pass through the viscometer; and C is the concentration of the solution.

Representative vinyl halide resins include homopolymers such as poly(vinyl chloride) and poly(vinylidene chloride) as well as copolymers of vinyl chloride with a vinyl ester of a lower alkanoic acid or other polymerizable olefinically unsaturated compound such as, for example, vinyl acetate, vinyl propionate, vinyl hexoate, methyl acrylate, butyl acrylate, methyl methacrylate, butyl methacrylate, methyl chloroacrylate, acrylonitrile, vinylidene chloride, dibutyl maleate, and the like. Also included are copolymers of a vinyl halide and vinyl ester of a lower alkanoic acid, e.g., vinyl chloride and vinyl acetate, which have been partially hydrolyzed and contain reactive hydroxyl groups. The hydroxyl-containing resins advantageously provide a means whereby the halide can be chemically combined in the urethane molecule by reaction with isocyanate groups (—NCO) to become an integral part of the final form. Carboxylic acid-containing resins, such as a coplymer of vinyl chloride and monobutyl maleate, are also useful in this invention since the carboxylic acid group can be chemically combined in the urethane molecule.

The preferred vinyl halide resins are poly(vinyl chloride) and copolymers of vinyl chloride with vinyl acetate which contain from about 25 to 99% by weight vinyl chloride.

The vinyl halide resins above described also can be used in the form of a plastisol, the term "plastisol" referring to fluid suspensions of finely divided vinyl halide resins in liquid plasticizers. The plastisol technique offers a distinct advantage in urethane applications by providing a fluid dispersion at room temperature which can be easily pumped or used in spray techniques.

Representative liquid plasticizers which can be employed include non-polymerizable ester plasticizers such as the alkyl and aryl phosphates, the alkyl phthalates, adipates, sebacates, azelates and expoxidized vegetable oil. Among these can be mentioned tri-(2-ethylhexyl) phosphate, tricresyl phosphate, di-(2-ethylhexyl) phthalate, and di-(2-ethylhexyl) adipate, etc. Other suitable plasticizers include triethylene glycol di(2-ethylhexoate), polyethylene glycol di(2-ethylhexoate), 2,2'-(2-ethylhexamido)-diethyl-di-(2-ethylhexoate), tetrabutyl thiodisuccinate and the commercial plasticizers sold under the trademark "Santicizer" which include:

Santicizer 8—A mixture of ortho and para toluene ethyl sulfonamides
Santicizer 9—A mixture of ortho and para toluene sulfonamides
Santicizer 130—N-isopropyl benzene sulfonamide
Santicizer 131—Mixed N-isopropyl benzene sulfonamide and N-isopropyl toluene sulfonamide
Santicizer 3—N-ethyl-p-toluene sulfonamide
Santicizer IH—Cyclohexyl-p-toluene sulfonamide The preferred plasticizers are relatively non-combustible plasticizers such as tricresyl phosphate, tri(2-ethylhexyl) phosphate, tri-(2-chloroethyl) phosphate, and tri-(dichloropropyl) phosphate. These plasticizers as well as others mentioned above can be employed in resin to plasticizer weight ratios in the range of about 5:1 to 1:2 and preferably 4:1 to 1:1.

The polyethers used in preparing the flame-resistant polyurethane foams include a wide variety of polyether derivatives of acyclic and alicyclic compounds. The designated polyethers have a molecular weight of from about 250 to 1500, a plurality of ether oxygens and at least two active hydrogens as measured and determined by the Zerewitinoff method, J.A.C.S., vol. 49, p. 3181 (1927).

Illustrative polyethers include the polyoxyalkylene polyols containing one or more chains of connected oxyalkylene groups which are prepared by the reaction of one or more alkylene oxides with acyclic and alicyclic polyols. Examples of the polyoxyalkylene polyols include the polyoxyethylene glycols prepared by the addition of ethylene oxide to water, ethylene glycol or dipropylene glycol; polyoxypropylene glycols prepared by the addition of propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and propylene oxide; and the polyoxybutylene glycols and copolymers such as polyoxyethyleneoxybutylene glycols and polyoxypropyleneoxybutylene glycols. Included in the term "polyoxybutylene glycols" are polymers of 1,2-butylene oxide, 2,3-butylene oxide and 1,4-butylene oxide.

Other acyclic and alicyclic polyols which can be reacted with ethylene oxide, propylene oxide, butylene oxide or mixtures thereof to provide useful polyethers include glycerol, trimethylolpropane, 1,2,6-hexanetriol, pentaerythritol, sorbitol, glycosides such as methyl, ethyl, propyl, butyl and 2-ethylhexyl arabinoside, xyloside, fructoside, glucoside, rhammoside, etc. and polyethers prepared by the reaction of alkylene oxides with sucrose, for example:

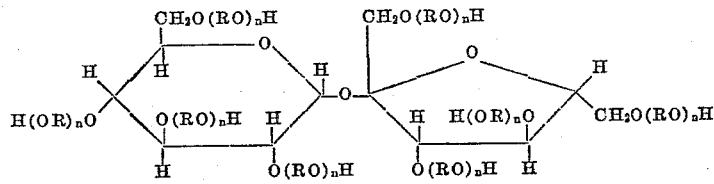

wherein R is ethylene, propylene, butylene or mixtures thereof and $n$ is an integer such that the average molecular weight of the polyether is 250 and higher.

Further included are polyethers prepared by reacting one or more of the alkylene oxides above noted with acyclic polyamines such as ethylenediamine, propylenediamine, butylenediamine, pentylenediamine, hexylenediamine, octylenediamine, nonylenediamine, decylenediamine; polyalkylene polyamines such as diethylenetriamine, triethylenetetramine, tetraethylenepentamine, dipropylenetriamine, and the like. A particularly suitable polyether is the propylene oxide addition product of diethylenetriamine represented by the formula:

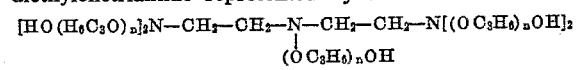

wherein $n$ represents an integer which provides an average molecular weight of 250 or higher.

The polyethers used in accordance with the invention are conventionally prepared by reacting together the desired compounds and alkylene oxides above noted in the presence of a catalyst, e.g., alkali metal catalysts such as sodium hydroxide and potassium t-butoxide, by adding the alkylene oxide to the starting material which is preferably stirred and in a molten state or slurried in an inert solvent. The reaction is carried out in the absence of water under atmospheric or superatmospheric pressure at temperatures of about 110 to 170° C. The amount of catalyst employed generally ranges from about 0.002 to 2.0% by weight based on the total amount of reactants, including the alkylene oxide or mixtures thereof appearing in the reaction product. To the extent required any conventional heat transfer means can be used to remove the exothermic heat of reaction. The products of the reaction are generally mixtures which can be used as such or further refined to provide a purified product.

The average molecular weight and reactivity of the alkylene oxide addition products can be determined readily by analysis for hydroxyl content. The hydroxyl number is a measure of and is proportional to the hydroxyl concentration per unit weight. The hydroxyl number is defined in terms of milligrams of KOH equivalent per gram of alkylene oxide reaction product and is, determined by reacting acetic anhydride (in pyridine solution) at refluxing temperature with the hydroxyl groups of the reaction product. The unreacted anhydride and acetic acid formed are titrated with aqueous sodium hydroxide using phenolphthalein as an indicator. The molecular weight can be readily calculated from the hydroxyl number by the formula:

$$M.W. = \frac{Functionality \times 1000 \times 56.1}{Hydroxyl\ No.}$$

The molecular weight of the polyether should range from at least 250 up to about 1500 depending upon the characteristics desired in the foamed urethane product. As a general rule, cellular urethane foams of maximum rigidity are obtained from polyethers having a molecular weight range of about 300 to 1250 whereas for semirigid foams the molecular weight of the polyether should be from about 800 to 1500. The selection of a particular polyether compound is governed by the properties desired in the final urethane composition and by practical considerations such as cost and commercial availability.

A variety of isocyanates may be employed for reaction with the polyethers above described to provide flame-resistant urethane foams according to the invention. Preferred isocyanates are polyisocyanates and polyisothiocyanates of the general formula:

$$R(NCG)_x$$

wherein G is oxygen or sulfur, $x$ is an integer of two or more and R is an alkylene, substituted alkylene, arylene or substituted arylene radical, a hydrocarbon, or substituted hydrocarbon containing one or more aryl —NCG bonds and one or more alkyl —NCG bond. R can also include radicals such as —RZR— where Z may be a divalent moiety such as —O—, —O—R—O—, —CO—, —CO$_2$—, —S—, —S—R—S—, —SO$_2$—, etc. Examples of such compounds include hexamethylene diisocyanate, 1,8 - diisocyanato-p-menthane xylylene diisocyanates, (OCNCH$_2$CH$_2$CH$_2$OCH$_2$)$_2$, 1-methyl - 2,4 - diisocyanato-cyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, xylene-α,α' - diisothiocyanate, and isopropylbenzene-α,4-diisocyanate.

Further included are dimers and trimers of isocyanates and diisocyanates and polymeric diisocyanates of the general formulae:

$$(RNCG)_x \text{ and } [R(NCG)_x]_y$$

in which $x$ and $y$ are two or more, as well as compounds of the general formula:

$$M(NCG)_x$$

in which $x$ is one or more and M is a monofunctional or polyfunctional atom or group. Examples of this type include ethylphosphonic diisocyanate, C$_2$H$_5$P(O)(NCO)$_2$ phenylphosphonic diisocyanate, C$_6$H$_5$P(NCO)$_2$; compounds containing a ≡Si—NCG group, isocyanates derived from sulfonamides [R(SO$_2$NCO)$_x$], etc.

The preparation of polyether-based urethane foams can be carried out by forming a prepolymer, i.e., pre-reacting molar equivalents of the polyether and isocyanate in the absence of water and thereafter producing a foam by the addition of excess isocyanate, catalyst, water and surfactant; by the one-shot method in which the polyether, blowing agent, and isocyanate reactants are simultaneously mixed together and allowed to react in the presence of a catalyst; or by the semiprepolymer technique wherein the polyether reactant is partially extended with excess isocyanate to provide a reaction product containing a high percentage of free isocyanate groups (20–35%) which is then foamed at a later stage by reaction with additional polyether, blowing agent and catalyst.

The amount of isocyanate used in the preparation of rigid or semirigid foams when external blowing agents are employed can be such that there is approximately the theoretical amount required to form a urethane linkage, —NHCO—O, in the polymer resulting from reaction of the isocyanate with the active hydrogens of the polyether. However, when the foaming is performed by means of isocyanate and water to form carbon dioxide, the amount of isocyanate employed is generally within 1.2 to 3.0 equivalents, preferably 1.2 to 2.0 equivalents, per equivalent of polyether.

The reaction of excess diisocyanate with a polyether produces a polymer having terminal isocyanato groups. When it is desired to form a foam, the mixture of the isocyanate-modified polyether reacts through the isocyanato groups with a chain extending agent containing active hydrogen, e.g., water, in the presence of a tertiary amine or an organic tin catalyst. This involves several reactions that proceed simultaneously including the reaction between the isocyanato groups and water to form urylene links (—NHCONH—) and carbon dioxide, as well as the reaction of the urylene links so formed with unreacted isocyanato groups to form biuret cross links. Depending upon the desired density of the urethane foam and the amount of cross linking desired, the total —NCO equivalent to total active hydrogen equivalent should be such as to provide a ratio of 0.8 to 1.2 equivalents of —NCO per equivalent of active hydrogen and preferably a ration of about 0.9 to 1.1 equivalents.

The foaming operation also can be effected by means of a blowing agent, such as a low boiling, high molecular weight gas, which vaporizes at or below the temperature of the foaming mass. In rigid foams intended for use in the field of insulation and structural reinforcement the incorporation of a gas lowers its heat conductivity. If a fluorocarbon gas such as trichloromonofluoromethane is used in blowing rigid foams, a lower K-factor is obtained than in rigid foams of equal density blown with air or carbon dioxide. The reactions that occur during this type operation include formation of the urethane linkage as well as the formation of isocyanate dimers and trimers. In addition, another reaction that can occur is the formation of allophanate structures.

Preferred blowing agents are the fluorocarbons such as trichloromonofluoromethane; dichlorodifluoromethane, dichlorofluoromethane, 1,1-dichloro-1-fluoroethane; 1-chloro-1,1-difluoro-2,2-dichloroethane; and 1,1,1-trifluoro, 2-chloro-2-fluoro, 3,3-difluoro, 4,4,4-trifluorobutane. The amount of blowing agent used will vary with density desired in the foamed product. In general it may be stated that for 100 grams of resin mix containing an average NCO/OH ratio of 1 to 1, about 0.005 to 0.3 moles of gas are used to provide densities ranging from 30 to 1 lbs. per cubic foot. If desired, water may be used in conjunction with the blowing agent.

Catalysts that are suitable for accelerating the polyether-isocyanate reaction include a wide variety of organic tin and amine catalysts.

Among the organic tin compounds that deserve particular mention are stannous acrylates such as stannous acetate, stannous octoate, stannous laurate, stannous oleate, etc.; stannous alkoxides such as stannous butoxide, stannous 2-ethylhexoxide, stannous phenoxide, o, m and p-stannous cresoxides, etc.; dialkyl tin salts of carboxylic acids, e.g., dibutyltin diacetate, dibutyltin dilaurate, dibutyltin maleate, dilauryltin diacetate, dioctyltin diacetate, and the like. Similarly there may be used a trialkyltin hydroxide, dialkyltin oxide or dialkyltin chloride. Examples of these compounds include trimethyltin hydroxide, tributyltin hydroxide, trioctyltin hydroxide, dibutyltin oxide, dioctyltin oxide, dilauryltin oxide, dibutyltin dichloride, dioctyltin dichloride, and the like.

Other catalysts which can be used alone or in combination with the above-indicated tin catalysts are amine catalysts such as 2,2,1-diazabicyclooctane, trimethylamine, 1,2-dimethylimidazole, triethylamine, diethylcyclohexylamine, N-methylmorpholine, triethanolamine and N,N,N',N'-tetramethyl-1,3-butanediamine. In many instances superior improvement is obtained when using an amine catalyst in combination with one of the above-noted tin catalysts.

The following examples illustrate the best mode now contemplated for carrying out the invention.

EXAMPLE 1

100 grams of a propylene oxide addition product of glycerol (Hydroxyl No. 640) and 175 grams of a semiprepolymer prepared therefrom by reaction with tolylene diisocyanate (29.9% total free NCO) were mixed with 1.2 grams of a silicone oil surfactant (siloxane-oxyalkylene copolymer), 0.8 gram dibutyltin dilaurate and 38 to 43 grams trichloromonofluoromethane. As soon as the mixture began to foam it was poured into an open mold and cured for 10 minutes at 70° C. The foamed product has a density between 1.8 and 2.0 lbs./cu. ft.

EXAMPLE 2

110 grams of a propylene oxide addition product of sorbitol (Hydroxyl No. 491) and 154 grams of a semiprepolymer prepared therefrom by reaction with tolylene diisocyanate (28.1% total free NCO) were mixed with 0.7 gram of dibutyltin dilaurate, 0.7 gram of a silicone oil surfactant (siloxane-oxyalkylene copolymer) and 48 to 56 grams trichloromonofluoromethane. As soon as the mixture began to foam it was poured into an open mold and allowed to cure for 10 minutes at 70° C. The foamed product has a density of about 2.1 lbs./cu. ft.

EXAMPLE 3

110 grams of a propylene oxide addition product of diethylenetriamine (Hydroxyl No. 493) and 154 grams of a semiprepolymer prepared by reaction of a propylene oxide addition product of sorbitol with tolylene diisocyanate (28.1% total free NCO) were mixed with 1.3 grams of a silicone oil surfactant (siloxane-oxyalkylene copolymer), and 47 to 53 grams trichloromonofluoromethane. As soon as the mixture began to foam it was poured into an open mold and cured for 10 minutes at 70° C. The foamed product has a density of about 2.2 lbs./cu. ft.

EXAMPLE 4

140 grams of a propylene oxide addition product of trimethylolpropane (Hydroxyl No. 530) were mixed with 122.5 grams tolylene diisocyanate, 0.7 gram dibutyltin dilaurate, 0.7 gram of a silicone oil surfactant (siloxane-oxyalkylene copolymer) and 41 to 44 grams of trichloromonofluoromethane. As soon as the mixture began to foam it was poured into an open mold and cured for 10 minutes at 70° C. The foamed product has a density of about 2.2 lbs./cu. ft.

EXAMPLE 5

110 grams of a propylene oxide addition product of sorbitol (Hydroxyl No. 491) and 154 grams of a semiprepolymer prepared therefrom by reaction with tolylene diisocyanate (28.1% total free NCO) were mixed with 0.7 gram of dibutyltin dilaurate, 0.7 gram of a silicone oil surfactant (siloxane-oxyalkylene copolymer) and 48 to 51 grams trichloromonofluoromethane. As soon as the mixture began to foam it was poured into an open mold and allowed to cure for 10 minutes at 70° C. The foamed product has a density of about 2.1 lbs./cu. ft.

EXAMPLE 6

75 grams of a propylene oxide addition product of sucrose (Hydroxyl No. 517) and 75 grams of a propylene oxide addition product of sorbital (Hydroxyl No. 491) were mixed with 125 grams of tolylene diisocyanate, 0.7 gram of a silicone oil surfactant (siloxane-oxyalkylene copolymer), 0.3 gram dibutyltin dilaurate and 43 to 49 grams of trichloromonofluoromethane. As soon as the mixture began to foam it was transferred into an open mold and cured for 10 minutes at 70° C. The foamed product has a density of about 2.1 lbs./cu. ft.

EXAMPLE 7

100 grams of a propylene oxide addition product of pentaerythritol (Hydroxyl No. 598) and 166 grams of a semiprepolymer prepared therefrom by reaction with tolylene diisocyanate (28.1% total free NCO) were mixed with 1.25 grams of a silicone oil surfactant (siloxane-oxyalkylene copolymer), 0.75 gram dibutyltin dilaurate and 43 to 48 grams of trichloromonofluoromethane. As soon as the mixture began to foam it was poured into an open mold and allowed to cure for 10 minutes at 70° C. The foamed product has a density of about 2.2 lbs./cu. ft.

Polyurethane foams as prepared in Examples 1 to 7 were blended prior to foaming with varying amounts of antimony trioxide and vinyl halide resin and tested for flammability characteristics according to the ASTM D-1692-59T test procedure previously described. If the foam burns (ASTM Class B) the rate of burning is reported in inches per minutes (i.p.m.). If the foam is self-extinguishing (ASTM Class S) or non-burning (ASTM Class N) the extent of burning is reported in inches. In instances where ignition of ten specimens results in nine specimens classified as non-burning (N) and one specimen self-extinguishing (S), the flammability of the sample has been judged inconclusive (I). The data tabulated in Table I below illustrates that polyurethane foams prepared from polyether derivatives of acyclic and alicyclic compounds can be readily rendered flame-resistant (ASTM Class N). The percentages shown are weight percentages based on the polyetherisocyanate reaction mixture.

*Table I*

| Ex. | Percent vinyl halide | Percent $Sb_2O^3$ | Density, p.c.f. | Appearance[1] | ASTM class | Rate or extent | Ig/B[2] |
|---|---|---|---|---|---|---|---|
| 1 | 6 | 4 | 2.0 | AAA | I | 3.5 in | 22/95 |
| 1 | 6 | 5 | 2.0 | AAA | N | 0.9 in | |
| 1 | 7 | 4 | 2.0 | AAA | N | 1.0 in | |
| 1 | 8 | 4 | 2.0 | ABA | N | 0.9 in | |
| 1 | 8 | 6 | 2.0 | ABA | N | 0.9 in | |
| 1 | 0 | 0 | 1.8 | ABA | B | 8.3 i.p.m | 14/92 |
| 2 | 6 | 4 | 2.1 | AAA | N | 0.8 in | |
| 2 | 8 | 6 | 2.0 | AAA | N | 0.8 in | |
| 2 | 12 | 8 | 2.1 | AAA | N | 0.8 in | |
| 3 | 8 | 6 | 2.1 | AAA | S | 3.2 in | 12/62.5 |
| 3 | 12 | 8 | 2.2 | AAA | S | 1.6 in | 30/52 |
| 4 | 6 | 4 | 2.2 | AAA | S | 2.9 in | 14/64 |
| 4 | 12 | 8 | 2.3 | AAA | S | 1.5 in | 15/50 |
| 5 | 3.3 | 1.3 | 2.0 | AAA | B | 2.3 i.p.m | 10/186 |
| 5 | 4.8 | 3.8 | 2.0 | AAA | N | 0.7 in | |
| 5 | 6.3 | 2.5 | 2.0 | AAA | N | 0.8 in | |
| 6 | 6.0 | 4.0 | 2.2 | AAA | S | 1.9 in | 22/80 |
| 6 | 8.0 | 6.0 | 2.1 | AAA | N | 0.7 in | |
| 6 | 12.0 | 8.0 | 2.1 | AAA | N | 0.8 in | |
| 7 | 6.0 | 4.0 | 2.1 | AAA | N | 0.8 in | |
| 7 | 8.0 | 6.0 | 2.2 | AAA | N | 1.0 in | |
| 7 | 12.0 | 8.0 | 2.3 | AAA | N | 1.0 in | |
| 5[3] | 0 | 0 | 1.8 | AAA | B | 3.53 i.p.m | 11/123 |
| 5[3] | 3.2 | 3.9 | 2.0 | AAA | S | 3.0 in | 17/86 |
| 5[4] | 4.8 | 1.3 | 2.0 | AAA | N | 0.7 in | |
| 5[4] | 6.0 | 4.0 | 2.1 | AAA | S | 3.2 in | 15/106 |
| 5 | [5]6.0 | 4.0 | 2.1 | AAA | S | 3.2 in | 15/106 |
| 5 | [5]8.0 | 6.0 | 2.1 | AAA | N | 0.7 in | |
| 5 | [5]12.0 | 8.0 | 2.2 | AAA | N | 0.7 in | |

[1] The appearance of the foam is rated by a three-letter code with the first letter estimating average cell size, the second letter uniformity of cell size and the third letter bulk flaws (splits, ridges, burns, etc.) wherein—1st letter: A=Fine; B=Medium; C=Large. 2nd letter: A=Good; B=Fair; C=Poor. 3rd letter: A=None; B=Minor; C=Severe.
[2] Ignition time in seconds/extinguishment time in seconds.
[3] Containing 1.0% tri-(2-ethylhexyl) phosphate.
[4] Containing 2.6% tricresyl phosphate.
[5] Copolymer of vinyl chloride and vinyl acetate having a reduced viscosity of 0.57 and containing 5.3 weight percent vinyl alcohol, 4.4 weight percent vinyl acetate and 90.4 weight percent vinyl chloride.

What is claimed is:

1. A process for the preparation of flame-resistant polyurethane foams which comprises reacting a polyether prepared by the addition of alkylene oxide to a member selected from the group consisting of polyol and polyamine having at least two active hydrogens and a molecular weight ranging from about 250 to 1500 with an organic polyisocyanate in the presence of a foaming agent and from 3.0 to 6.0 percent by weight antimony trioxide and from 4.0 to 8.0 percent by weight of a vinyl chloride resin having a reduced viscosity ranging from 0.1 to 10.0.

2. The process of claim 1 wherein the vinyl chloride resin is a member selected from the group consisting of poly(vinylchloride) and copolymers of vinyl chloride and vinyl acetate.

3. The product produced according to the process of claim 1.

4. The process of claim 2 wherein the polyether is an alkylene oxide addition product of glycerol.

5. The process of claim 2 wherein the polyether is an alkylene oxide addition product of diethylenetriamine.

6. The process of claim 2 wherein the polyether is an alkylene oxide addition product of 1,1,1-trimethylolpropane.

7. The process of claim 2 wherein the polyether is an alkylene oxide addition product of sorbitol.

8. The process of claim 2 wherein the polyether is an alkylene oxide addition product of sucrose.

References Cited in the file of this patent

UNITED STATES PATENTS

| | | |
|---|---|---|
| 2,634,244 | Simon et al. | Apr. 7, 1953 |
| 2,955,056 | Knox | Oct. 4, 1960 |